United States Patent [19]
Fox

[11] Patent Number: 6,158,163
[45] Date of Patent: Dec. 12, 2000

[54] DEVICE FOR RELEASEABLY RETAINING A FISHING LINE

[75] Inventor: Clifford Royston Fox, Chelmsford, United Kingdom

[73] Assignee: Fox Design International Limited, Essex, United Kingdom

[21] Appl. No.: 09/132,310

[22] Filed: Aug. 11, 1998

[30] Foreign Application Priority Data

Aug. 12, 1997 [GB] United Kingdom .................... 9717018

[51] Int. Cl.[7] .......................... A01K 85/01; A01K 87/00; A01K 91/00
[52] U.S. Cl. .................... 43/43.13; 43/25; 43/17
[58] Field of Search ................. 43/43.13, 25, 17

[56] References Cited

U.S. PATENT DOCUMENTS

| | | | |
|---|---|---|---|
| 664,889 | 1/1901 | Ogimura | 43/25 |
| 1,709,436 | 4/1929 | Koester | 43/25 |
| 2,183,445 | 12/1939 | Conterman | 24/329 |
| 2,658,299 | 11/1953 | Maxfield | 43/15 |
| 2,713,228 | 7/1955 | Grunwald | 43/25 |
| 2,730,830 | 1/1956 | Smith | 43/25 |
| 2,791,858 | 5/1957 | Kernodle | 43/25 |
| 3,499,242 | 3/1970 | Tucker, Sr. | 43/43.13 |
| 4,015,362 | 4/1977 | Johnson | 43/43.11 |
| 4,746,253 | 5/1988 | Simmons | 43/17 |
| 5,129,174 | 7/1992 | Wilson | 43/17 |
| 5,450,687 | 9/1995 | Fox | 43/17 |

FOREIGN PATENT DOCUMENTS

| | | | |
|---|---|---|---|
| 524922 | 7/1950 | Canada | 43/25 |
| 540116 | 2/1952 | Canada | 43/25 |
| 964491 | 8/1950 | France | 43/25 |
| 1176849 | 4/1959 | France | 43/25 |
| 1195493 | 11/1959 | France | 43/25 |
| 1418726 | 10/1965 | France | 43/25 |
| 575057 | 3/1958 | Italy | 43/25 |

*Primary Examiner*—Michael J. Carone
*Assistant Examiner*—Fredrick T. French, III
*Attorney, Agent, or Firm*—Clark & Brody

[57] ABSTRACT

A device for releaseably retaining a fishing line comprising a main body and two leg portions extending from the main body. The device further comprises resilient means acting upon at least one of the leg portions to urge the latter towards the other leg portion with a force which, for a given relative position of the two leg portions, is adjustable.

9 Claims, 13 Drawing Sheets

DEVICE FOR RELEASEABLY RETAINING A FISHING LINE

TECHNICAL FIELD

The present invention relates to a device for releaseably retaining a fishing line comprising a main body and two leg portions extending from the main body.

BACKGROUND OF THE INVENTION

One such construction which has been proposed hitherto has respective bobbles at the end of the legs, and these bobbles touch one another so that a fishing line can be captured between the legs, but can be jerked away by an angler so that, with sufficient force, the line slips between the two bobbles.

Such a releaseably retaining device is useful on a bite indicator of the kind which moves when a bite occurs, such movement being caused by movement of the fishing line.

A problem encountered by such a construction is that the line may snag when a bite occurs, irrespective of whether the line is being put under greater tension or less tension by the fish. In addition, it is difficult on the one hand to achieve a free running of the line through the retaining device whilst obtaining a positive hold on the line until a strike by the angler is made, at the same time achieving readily the release of the line from the retaining device upon a strike.

SUMMARY OF THE INVENTION

It is the aim of the present invention to obviate one or more of these disadvantages.

Accordingly, the present invention is directed to a device for releasable retaining a fishing line comprising a main body and two leg portions extending from the main body in which the device further comprises resilient means acting upon at least one of the leg portions to urge the latter towards the other leg portion with a force which, for a given relative position of the two leg portions, is adjustable.

This allows for different diameters of line, reducing the risk of breakage for any given thickness of line.

Preferably, at least respective parts of the leg portions are parallel. It is further desirable to have a bend in at least one of the leg portions to improve the extent to which the line is retained.

Advantageously, the said at least one of the leg portions is pivotally mounted on the said main body. The said resilient means may comprise a compression spring. The adjustment of the said force may be achieved by means of a cam. The latter may follow a portion of a helix, that is to say it may follow the path of a curved ramp.

Such a device may be placed at the free end of a bite indicator comprising an arm which is pivotally mounted at the other end.

Alternatively, such a device may be at the free end of a springy-wire bite indicator.

An example of a device for releaseably retaining a fishing line, in accordance with the present invention, will now be described with reference to the accompanying drawings in which:

DETAILED DESCRIPTION OF THE PREFERRED EMBODIMENT

Figure 1:
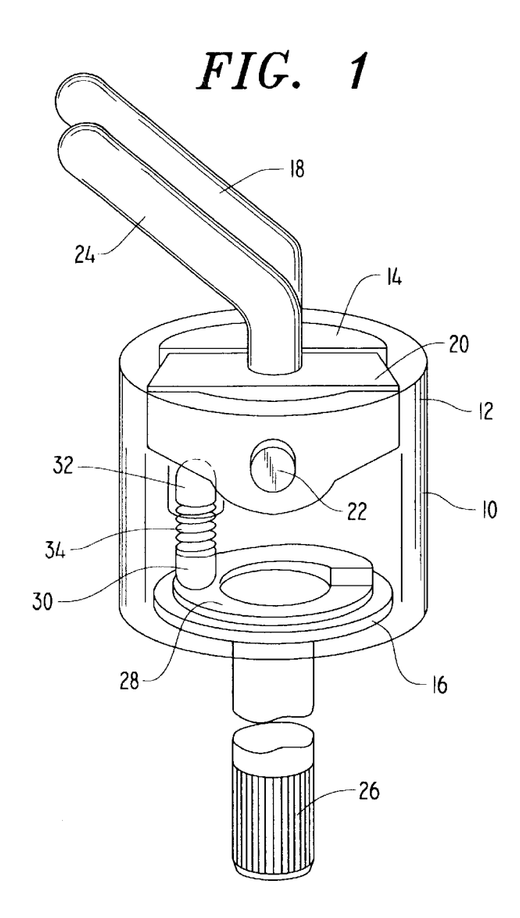
FIG. 1 is a diagrammatic see-through view of such device.

The device shown in FIG. 1 comprises a housing 10 having a generally cylindrical side wall 12, a top 14 and a base 16. A first stainless steel leg portion 18 extends upwardly from the top 14 of the housing 10, and is fixedly secured thereto. A rocker 20 is held within the housing 10, and is pivotally held therewithin at pivots 22 only one of which is visible in FIG. 1. An upper face of the rocker 20 is generally flush with an outer face of the top 14 of the housing 10. A further stainless steel leg portion 24 extends upwardly from the main face 20, and is fixedly secured within the rocker 20. Thus there is a spacing between the bases of the leg portions 18 and 24 significant to accommodate a wide range of diameters of line.

The base 16 of the housing 10 is rotatable relative thereto, and its angular position may be adjusted by means of a knurled shaft 26 which is integral with the base 16.

On the upper inner surface of the base 16 there is provided an annular ramp or cam 28, the upper main face of which follows the path of the first turn of a helix.

A sliding portion 30 is retained within the housing 10 so as to be in sliding engagement with the cam 28. A further sliding member 32 slidingly engages a lower slanting face of the rocker 20. A helical compression spring 34 extends between the numbers 30 and 32, and thereby urges the rocker 20 and with it the leg portion 24 in a clockwise sense viewing these parts as in FIG. 1, about the pivot 22. In this way, the leg portion 24 is urged towards and abuts the leg portion 18. The force with which it is so urged can be adjusted by rotation of the knurled shaft 26 relative to the housing 10.

Each of the leg portions 18 and 24 is provided with a bend in it so that each leg portion extends upwardly for a short distance and then in the slanted direction. The fixed leg portion 18 extends a little further from the housing part than the movable leg portion 24.

Figure 2:
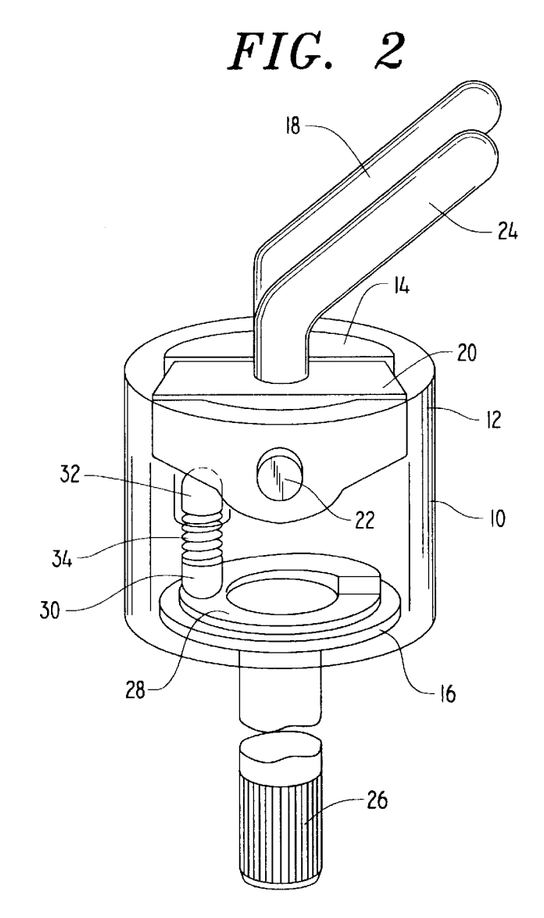
FIG. 2 is a diagrammatic see-through view of a modified such device.
Figure 3:
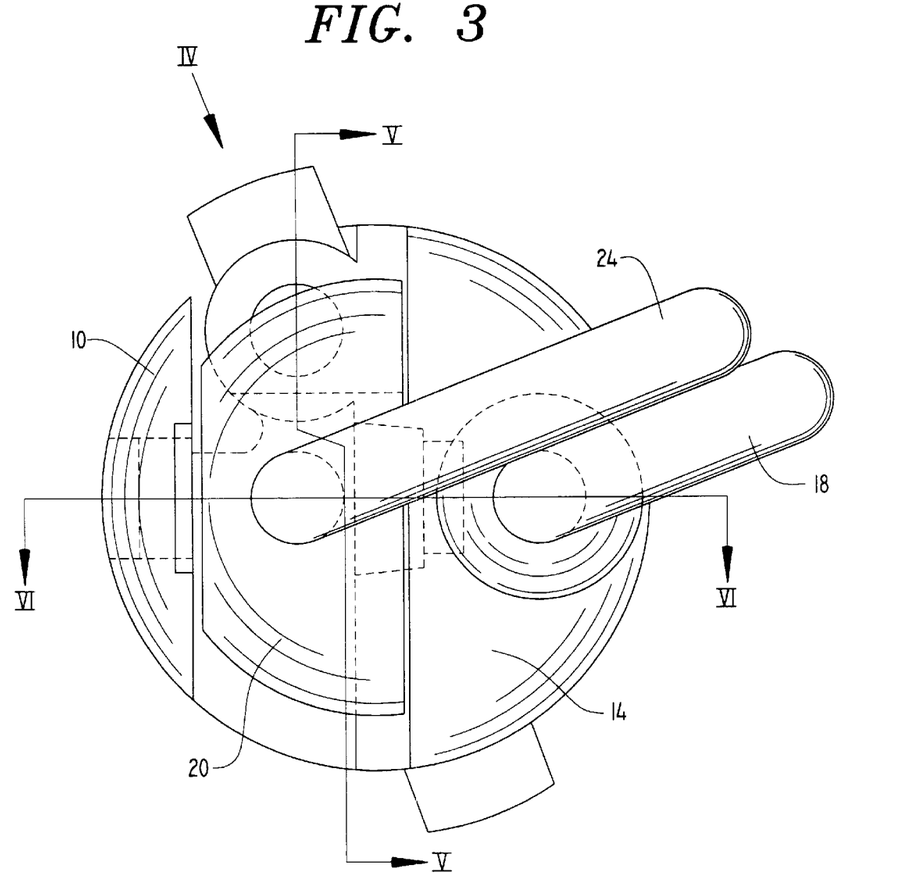
FIG. 3 shows a view from above of the device shown in FIG. 1, in greater detail.
Figure 4:
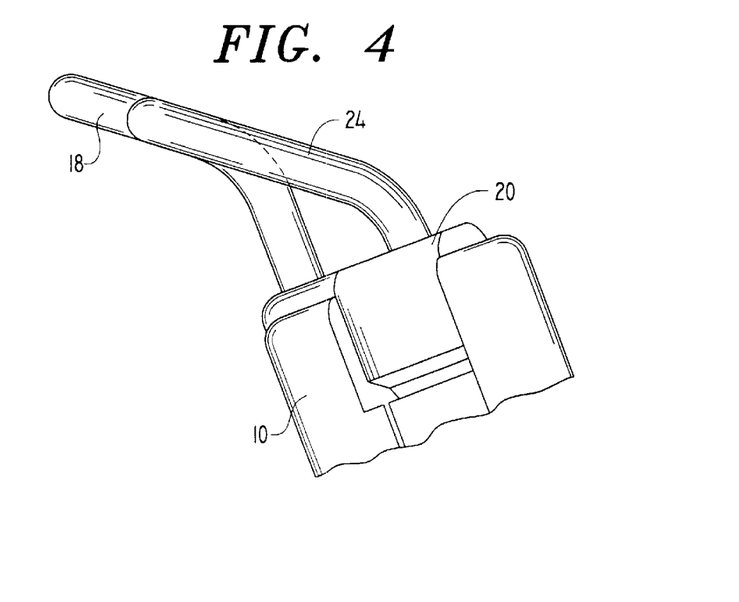
FIG. 4 shows a view of part of the device shown in FIG. 3 viewing in the direction of arrow IV therein.

In the modification shown in FIG. 2 all corresponding parts are provided with the same reference numerals as in FIG. 1, the only difference being that in this Figure the leg portions 18 and 24 slant in the opposite direction relative to the direction of slant shown in FIG. 1.

In both embodiments of the invention, the leg portions 18 and 24 are generally parallel to one another.

FIGS. 3 to 6 show the construction of the device shown in FIG. 1 in greater detail, corresponding parts in these Figures being given the same reference numerals as in FIG. 1.

Figure 5:
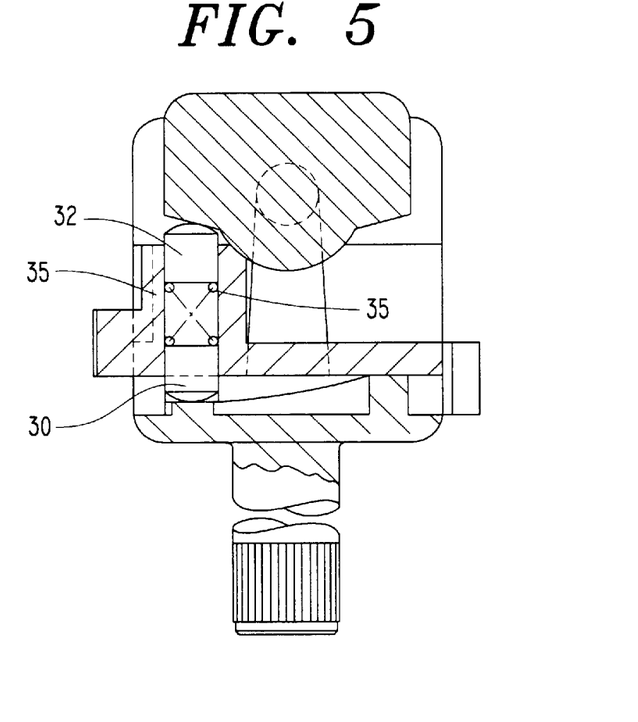
FIG. 5 shows a sectional view of the device shown in FIG. 3 along the two-part line V—V thereof.

It will be seen from FIG. 5 that the sliding portions 30 and 32 are constrained to move linearly within a cylindrical sleeve 35 of the housing 10, which also houses the spring 34 sandwiched between the portions 30 and 32.

Figure 6:
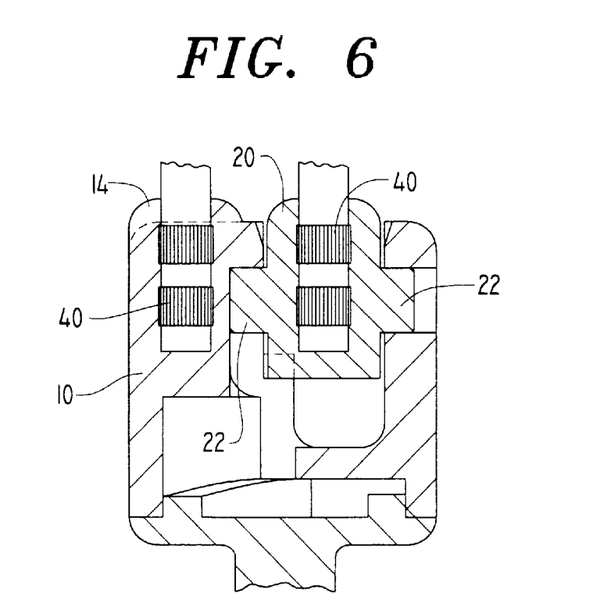
FIG. 6 shows an axial sectional view of the device shown in FIG. 3, taken along the line VI—VI thereof.

It will be seen from FIG. 6 that the lower ends of each leg portion 18 and 24 are anchored in their respective housing parts by having knurled portions 40 encapsulated within the material of those parts.

Figure 7:
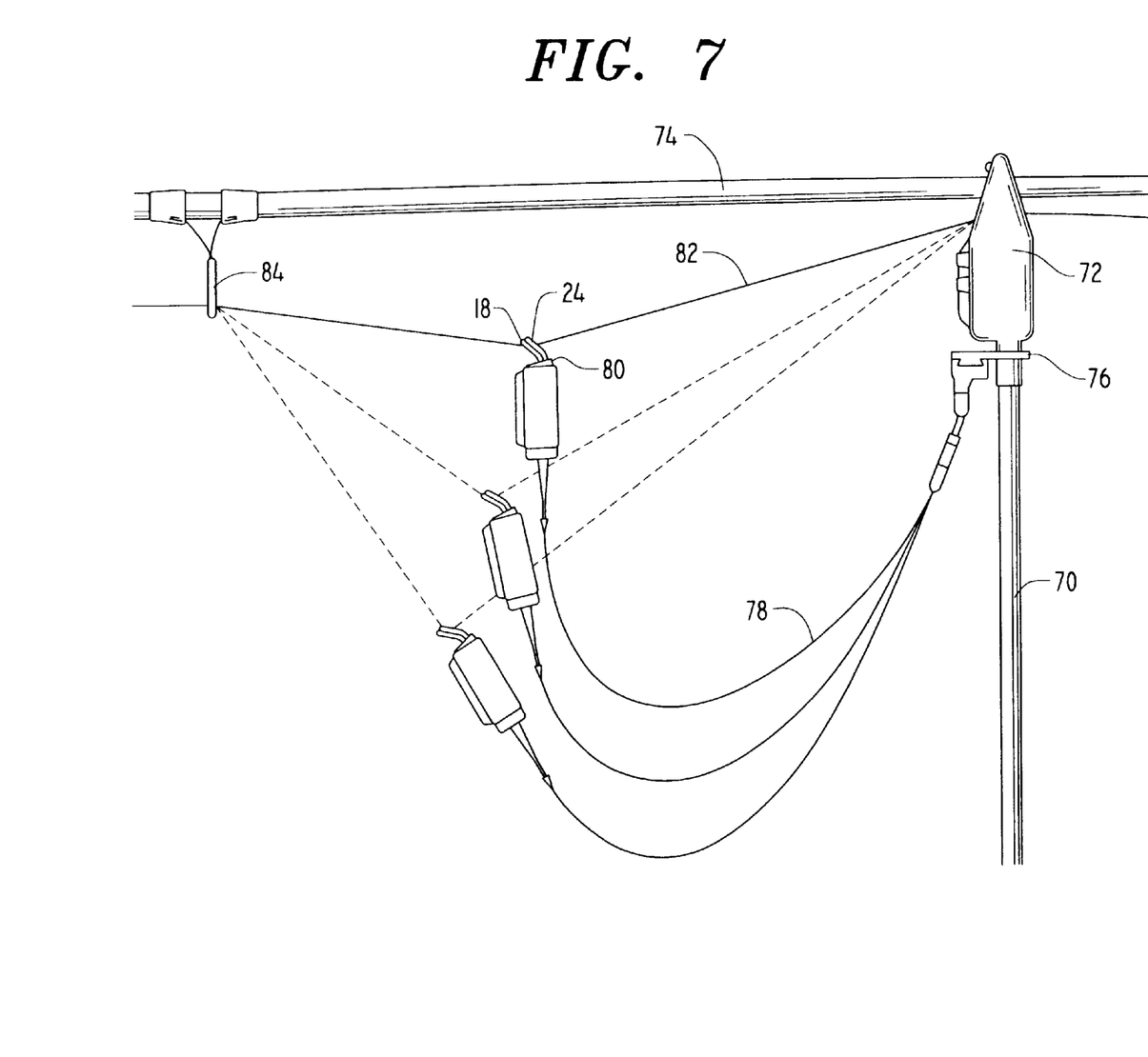
FIG. 7 shows a side view of fishing apparatus including such a device on the free end of a springy-arm bite indicator.

In the angling apparatus shown in FIG. 7, there is shown a bank stick 70 on the upper end of which is mounted a bifurcated electronic bite indicator 72. A fishing rod 74 is seated within the bifurcations of the electronic bite indicator 72.

A mounting plate 76 is secured between the bite indicator 72 and the top of the bank stick 70 and to that mounting place 76 is secured a springy-arm bite indicator 78 at the free end of which there is mounted a line engagement device 80 as illustrated in FIGS. 1 and 3 to 6. A fishing line 82 is held between the leg portions 18 and 24 of the device 80 so that the fishing line 82 traces out a v shape between the bite indicator 72 and one of the rings 84 (the others not being shown) of the fishing rod 74. FIG. 7 provides a diagrammatic representation of three different possible positions of the bite indicator 78. For two of these positions, the fishing line 82 is shown as a broken line.

If the angler reacts to a bite indicated by one or both of the bite indicators 72 and 78, and makes a strike, the line 82 is readily released from the retaining device 80.

Figure 8:
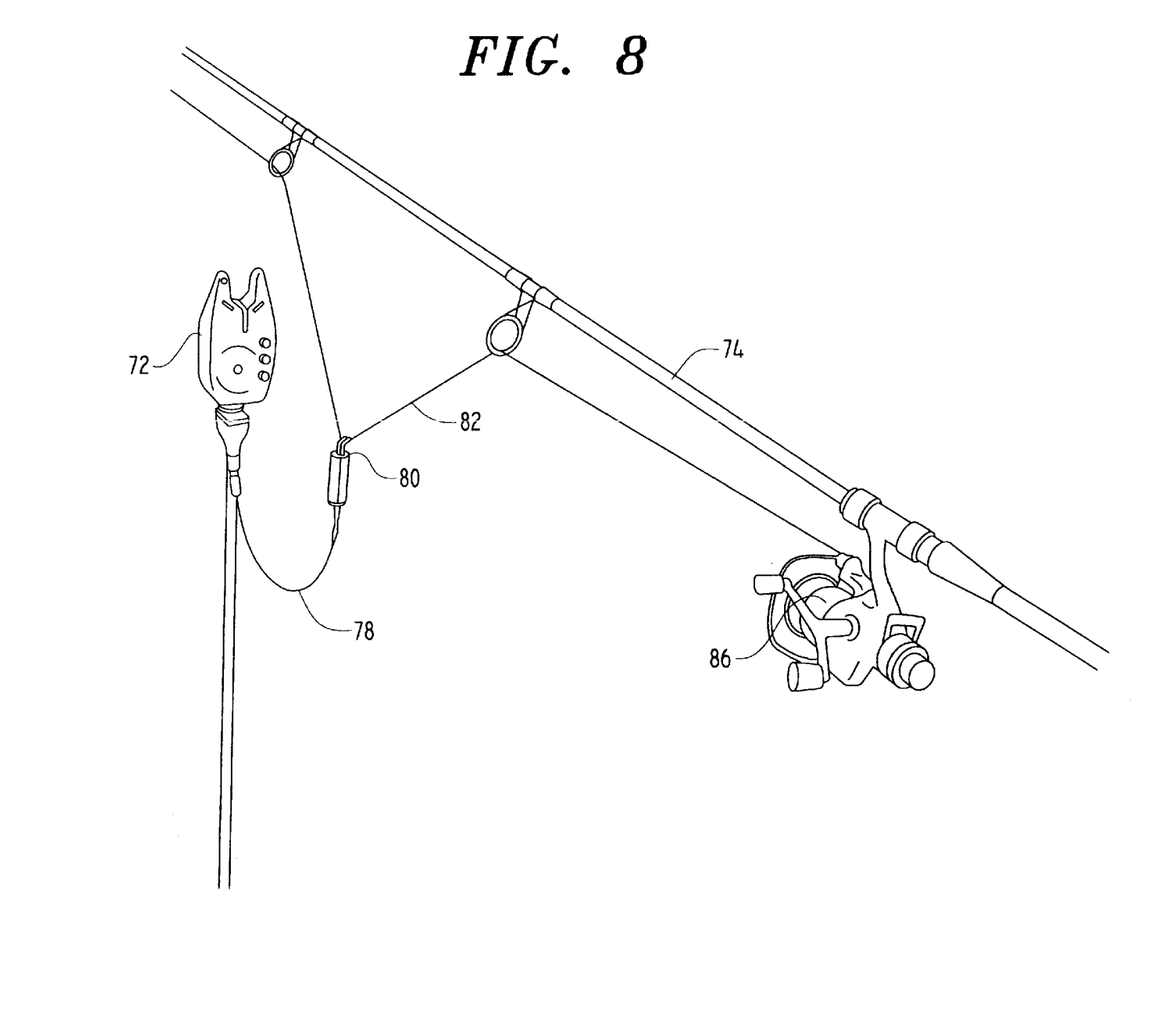
FIG. 8 is a perspective view of the apparatus shown in FIG. 7 viewed from the other side and with further parts of the apparatus in view.

FIG. 8 shows the apparatus from the other side, and includes a reel 86 of the rod 74. It also shows the commencement of the strike insofar as the rod 72 has been lifted clear of the bite indicator 72, and the line 82 is about to be released from the retaining means 80 at the end of the springy-arm bite detector 78.

Figure 9A:
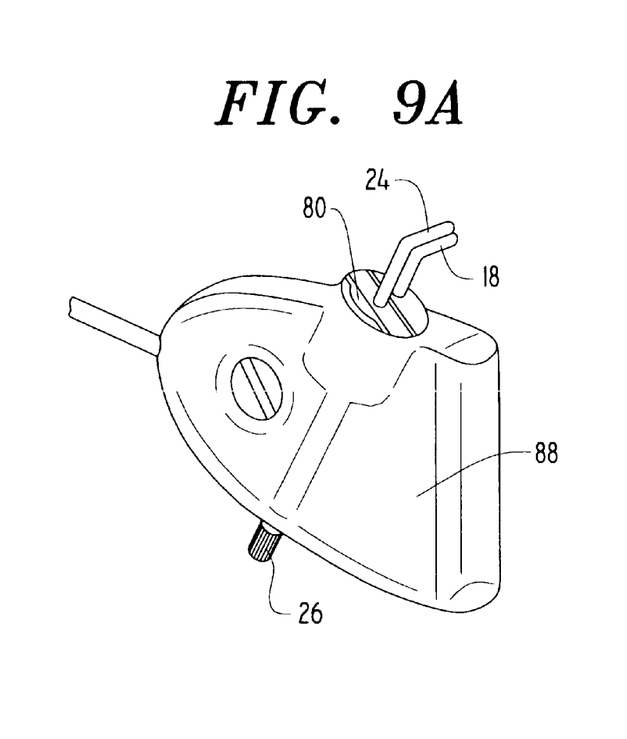
FIGS. 9a, 9b and 9c show a perspective view from one side and above, a side view, and a view from above respectively, of such a device inserted in the head of a bite indicator.
Figure 9B:
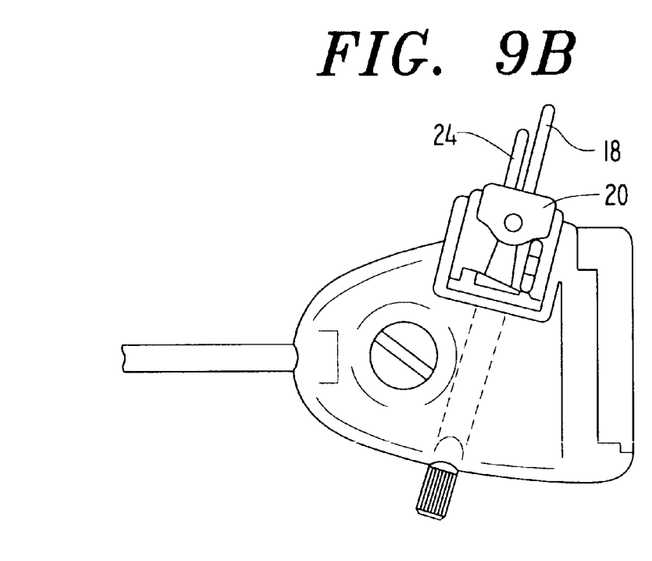
Figure 9C:
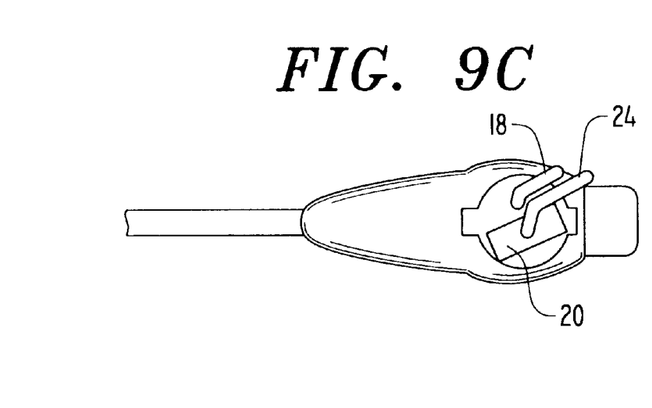

In FIGS. 9a, 9b and 9c, the device 80 with its leg portions 18 and 24 extending outwardly therefrom is seated in the head 88 of a modified form of bite indicator. The knurled shaft 26 protrudes beyond a lower side of the head 88.

Figure 10:
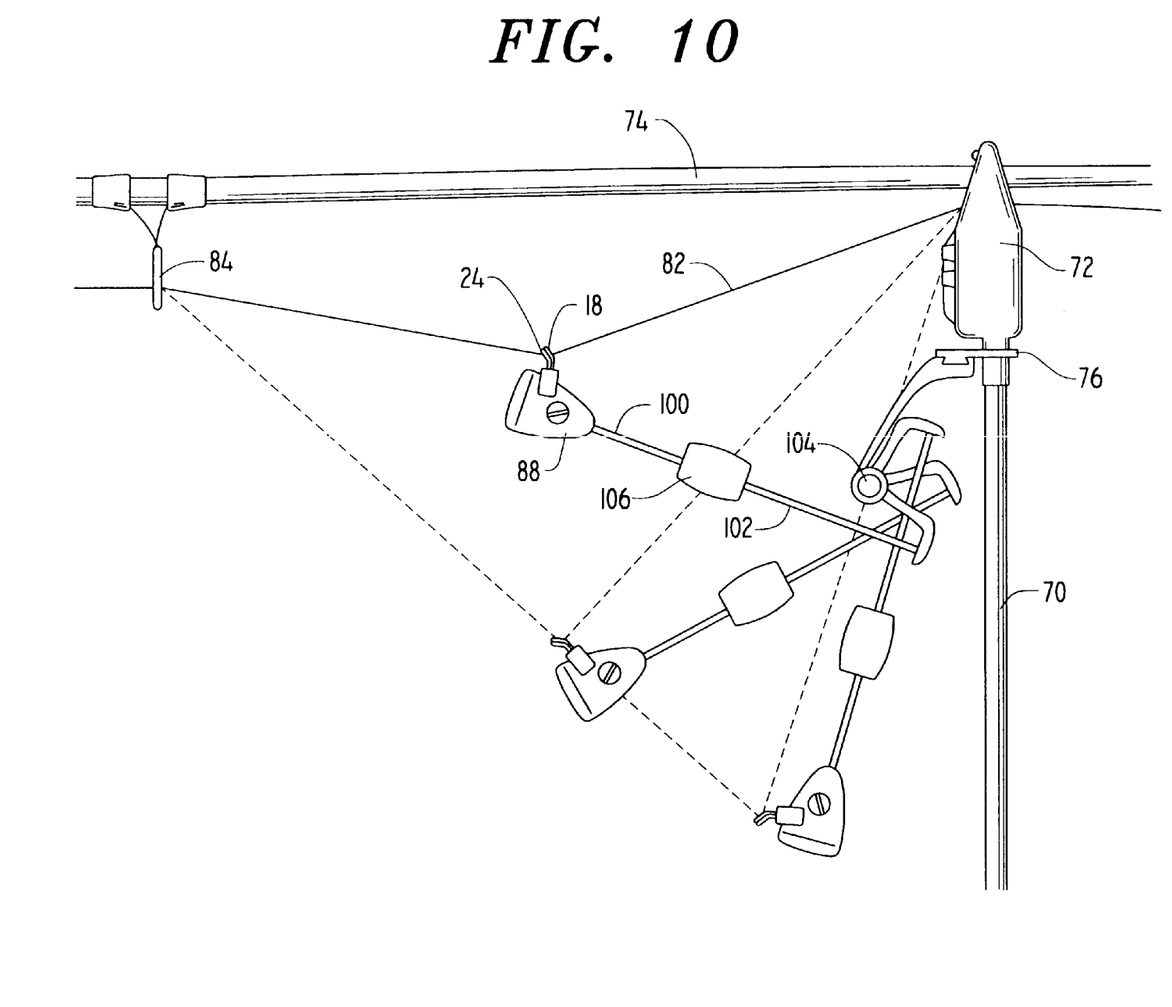
FIG. 10 is a view from the other side of the angling apparatus including the part shown in FIGS. 9a, 9b and 9c.

FIG. 10 shows the full construction of the bite indicator of which the head 88 is a part. The apparatus shown in FIG. 10 corresponds to that shown in FIG. 7, with like parts being given the same reference numerals, except that the springy-arm bite indicator 78 has been replaced by a bite indicator 100 in the form of a generally rigid arm 102 which is connected to one end to a pivot 104, the other end of the arm 102 being provided with the head 88. A slidable weight 106 is attached to the arm 102 and can be slid backwardly or forwardly along the arm to adjust the tension of the line 82. The axis of the device 80 is at about 16° to an imaginary plane which is perpendicular to the arm 102. Furthermore, at least one of the leg portions, in this case the leg portion 18, extends over the line of the arm 102, to capture the line 82.

Figure 11:
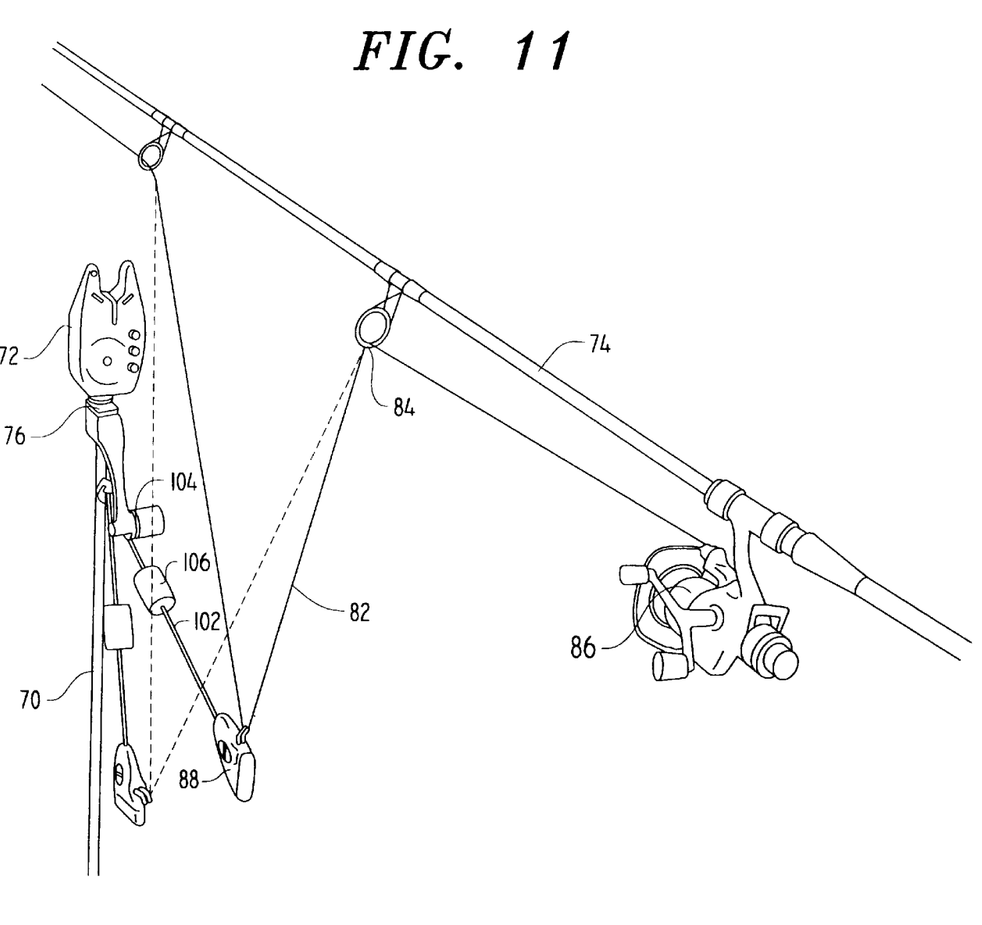
FIG. 11 shows a perspective view from one side and from above of the apparatus shown in FIG. 10, with further parts of the apparatus in view.

The view shown in FIG. 11 bears the same relationship to FIG. 10 as the view shown in FIG. 8 bears to that shown in FIG. 7.

Details of the pivot 104 shown in FIGS. 10 and 11 are shown in FIGS. 12 to 19. The pivot comprises a generally cylindrical housing 120 which is provided with a knurled portion 122 at an outer end thereof to assist the user in grasping and rotating the latter. The housing 120 surrounds an axially extending hollow shaft 124, an outer end of which is closed by means of a flanged plug 126 having an annular groove 128 extending around the outside of this flange. An open frictional ring 130 is seated within this groove 128 so that a portion of the ring 130 protrudes outwardly therefrom and contacts an inner face of the cylindrical housing 120.

Figure 12:
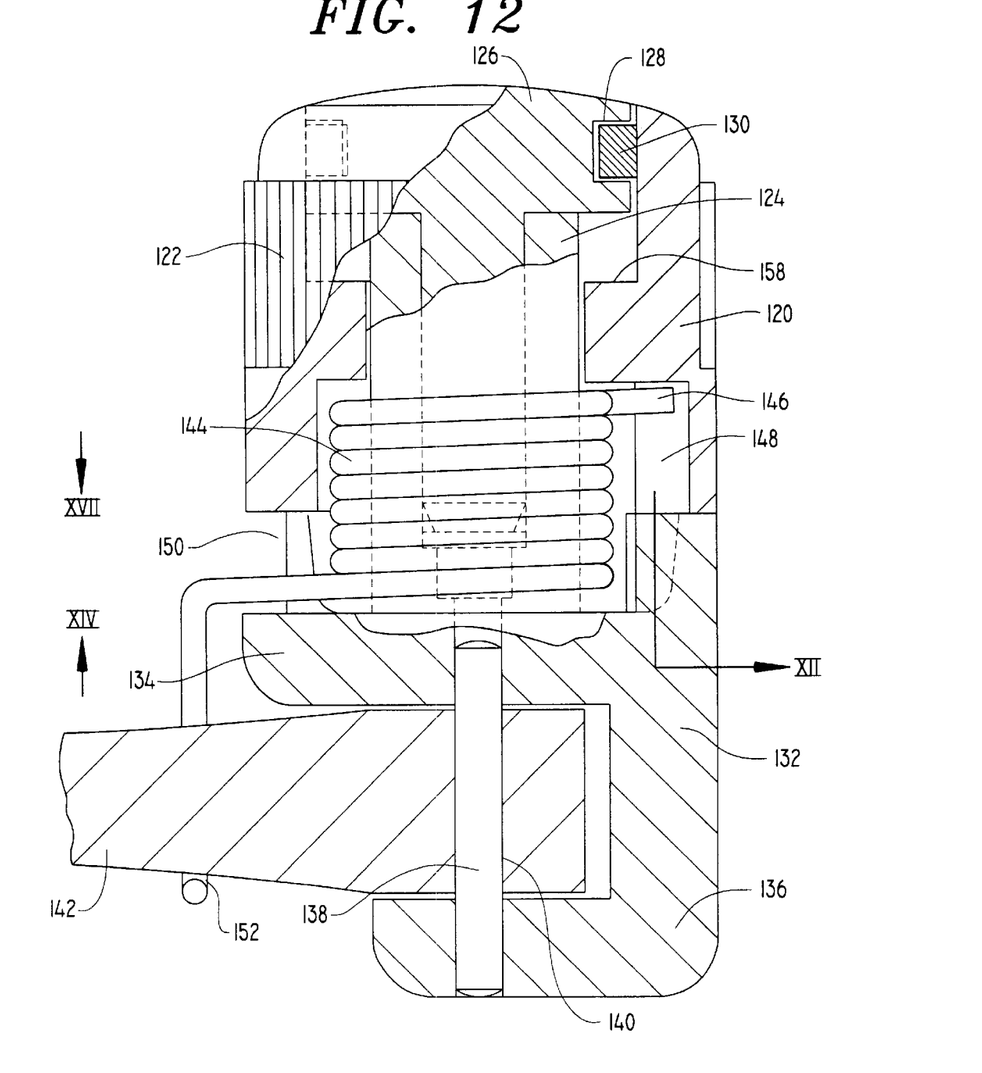
FIG. 12 shows an axial sectional view through a part of the apparatus shown in FIG. 11.

The shaft 124 is integral with a mount 132 which has a generally circular base portion 134 and a further portion 136 which is generally L-shaped in the axial section shown in FIG. 12. A pivot pin 138 has respective ends received in respective holes of the two portions 134 and 136. The pin 138 extends through a through hole 140 provided in the end of a pivoted connector member 142 to which is secured the pivot arm 102 shown in FIGS. 10 and 11.

An axially extending helical spring 144 is enclosed within the housing 120, and has one end 146 abutting against an abutment 148 provided on the interior of the housing 120, and another end which extends outwardly from the housing 120 through a slot 150 provided therein and thence in an axial direction to a portion 152 of that end of the spring 144 which engages the connecting portion 142 at a position thereof which is spaced from the pivot pin 138.

Figure 12A:
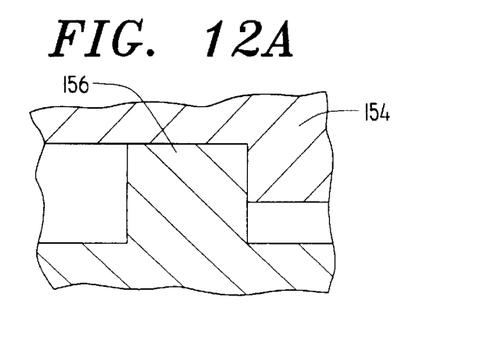
FIG. 12a shows a sectional view on the line XII in FIG. 12.

The housing 120 and the base 134 interengage one another by respective castellations 154 and 156, as shown more clearly in FIG. 12a.

Figure 13:
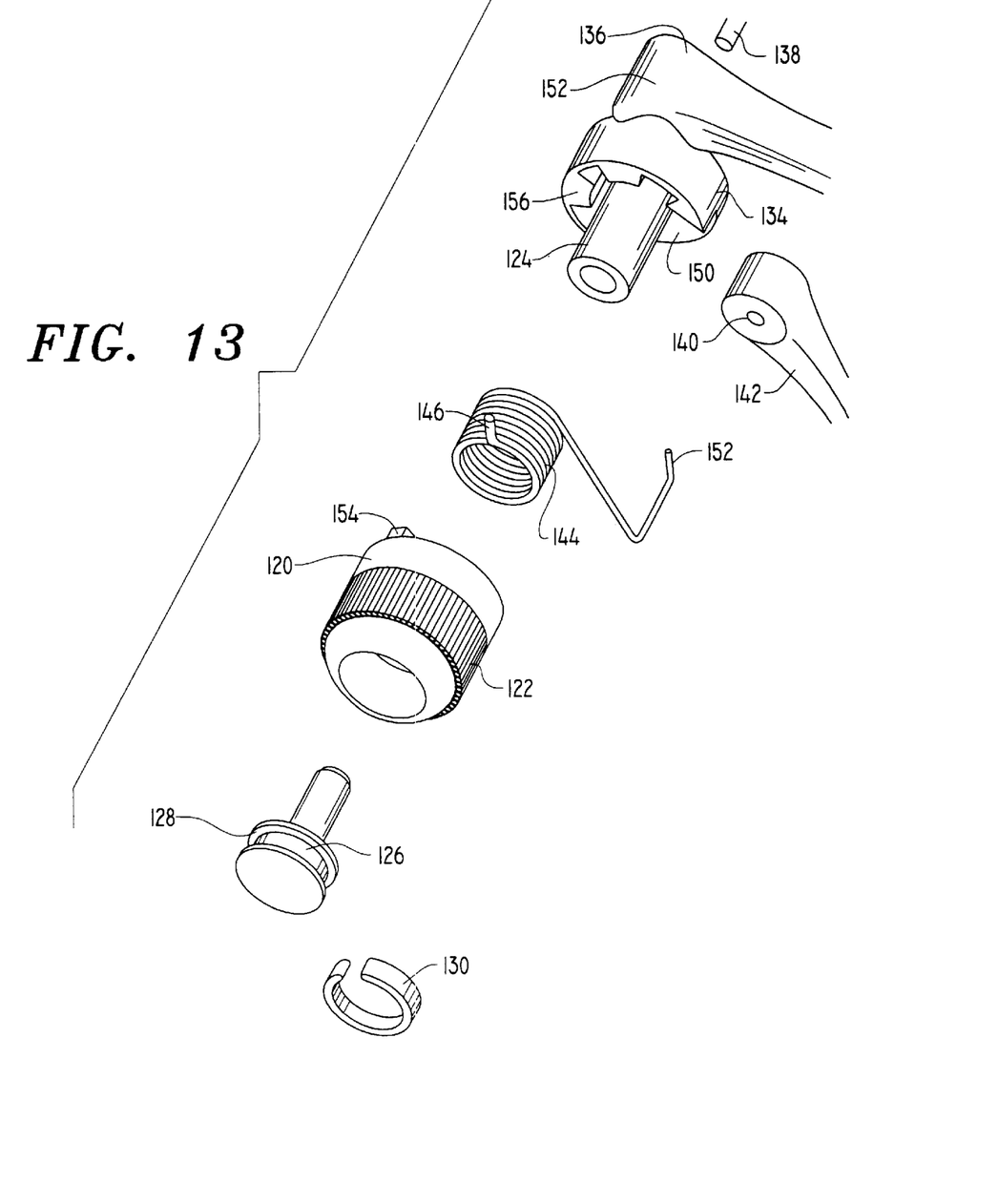
FIG. 13 shows an exploded view of the part of the apparatus shown in FIG. 12.
Figure 14:
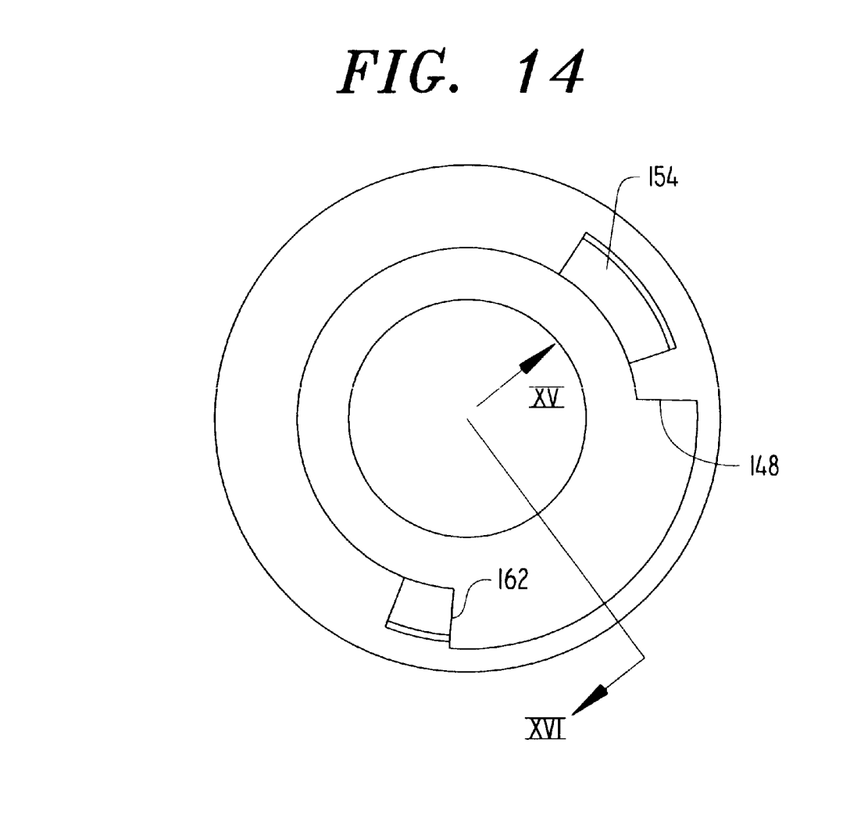
FIG. 14 shows an end view of a component viewed in the direction XIV indicated in FIG. 12.
Figure 15:
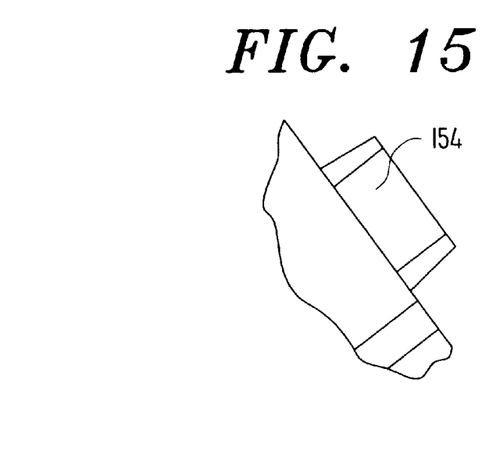
FIG. 15 shows a portion of the component shown in FIG. 14 viewed in the direction XV indicated in that Figure.
Figure 16:
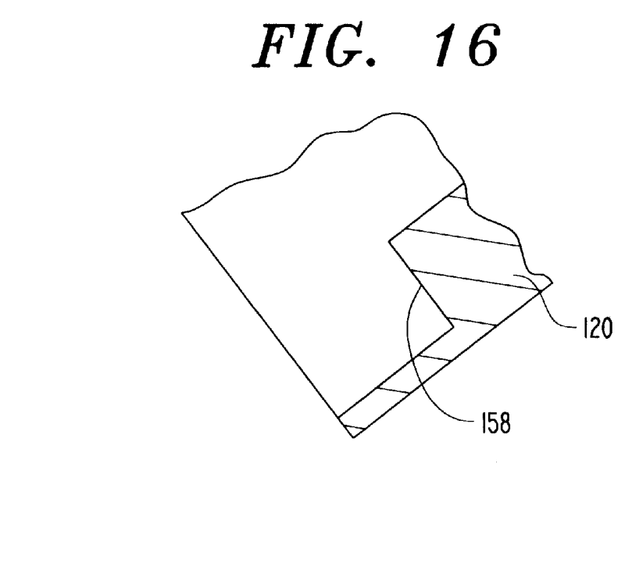
FIG. 16 shows a portion of the component shown in FIG. 14 viewed in the direction XVI indicated in that Figure.
Figures 17, 18:
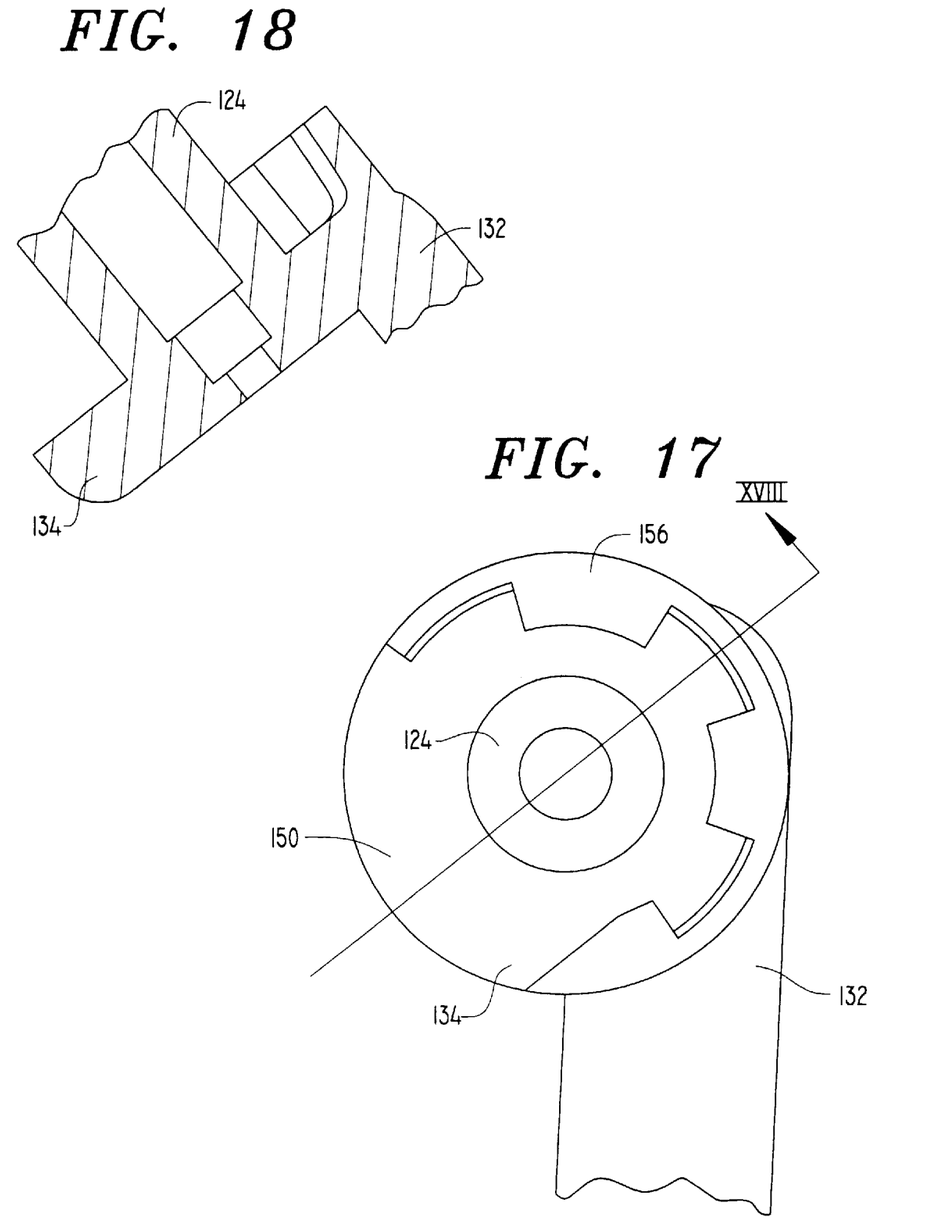
FIG. 17 shows an end view of a further component viewed in the direction XVII indicated in FIG. 12.
FIG. 18 shows a sectional view of the component shown in FIG. 17 taken along the line XVIII indicated therein.
Figure 19:
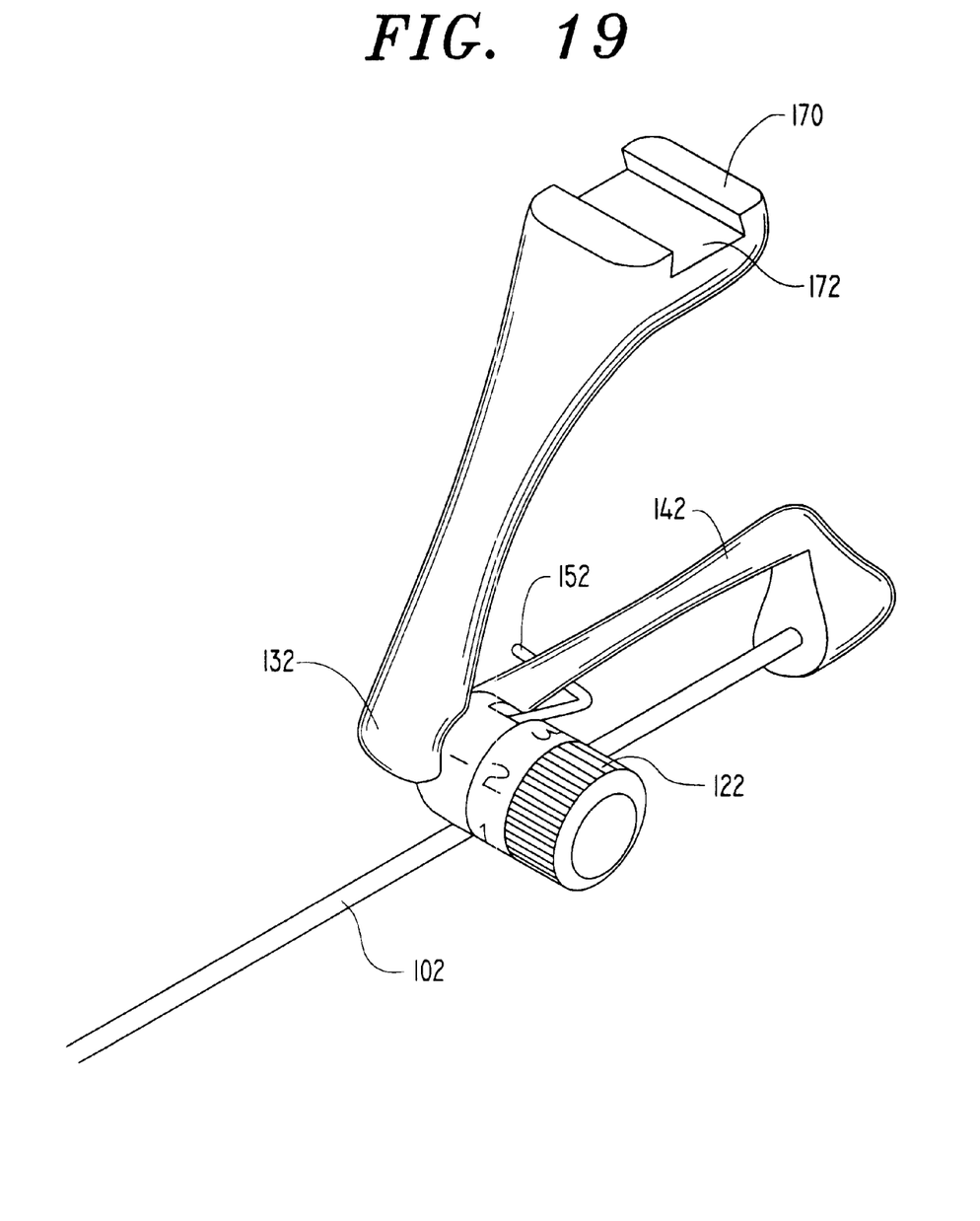
FIG. 19 shows a perspective view of the part shown in FIG. 12 with further portions thereof shown more fully.

FIGS. 13 and 19 show more clearly how the mount 132 is made integral with an attachment portion 170 having a female part of a dovetail joint 172, to enable the pivot 104 to be connected to the plate 76 shown in FIGS. 10 and 11. FIG. 19 also shows how the spring assembly acts on the arm 102 also shown in FIGS. 10 and 11.

It will be appreciated from FIG. 12 that the spring 144 acts on the connector member 142 so as to urge the latter to rotate about the pin 138. This may be used to increase the downward pull of the head 88 on the line 82, or to counter the torque already applied by the weight 106. It therefore can be used to provide a fine adjustment to this torque. Alternatively, the weight 106 may provide the fine adjustment relative to the spring assembly. This adjustment itself may be varied by rotation of the housing 120 relative to the base 134. To effect such rotation, the housing 120 is first of all moved axially and outwardly away from the base 132 to disengage the respective castellations 154 and 156. A shoulder 158 provided on the inside of the housing 120 will abut the flange of the plug 126 if the housing 120 is pulled out too far. In this way, the plug 126 acts as a stop against accidental removal of the housing 120.

The housing 120 may now be rotated about the axis of the pivot to increase or decrease the force applied by the spring 144 to the connector member 142. The selected axial rotation can be maintained by re-engaging the castellations 154 and 156 of the housing 120 and the base 134 (although the ones actually labelled 154 and 156 will not now be engaging one another).

In a zero setting of the housing 120, the end 146 of the spring 144 is free to move between the abutments 148 and 162 without any force being applied by the spring to the connecting member 142. In this way a zero or a generally optimum setting can be made by means of the weight 106 without interference from the spring, and then a finer adjustment can be made by means of the spring assembly by subsequent rotation of the housing 120.

This therefore shows one embodiment of a bite indicator comprising an arm which is pivotally mounted on a support at one of its ends and fishing line engagement means at the other, there being resilient means provided at the pivotal mount to vary the force with which the engagement means act on the line, the resilient means acting on one of two parts which can be selectively rotated relative to one another to vary the torsional force exerted by the resilient means, in which the two parts are held at a selected relative angular position by mutually engaging castellations or mutually engaging portions, at least one of which has a leading face and a trailing face which is generally parallel to the axis of relative rotation.

Many variations and modifications to the illustrated device will readily occur to the reader of ordinary skill in the art without taking it outside the scope of the present invention. For example, the function of the spring 34 or 144 could be performed by foam or rubber.

I claim:

1. A device for releaseably retaining a fishing line comprising a main body and two leg portions extending from the main body in an upward direction and positioned with respect to each other to both engage said fishing line, in which the device further comprises means for urging at least one of the leg portions towards the other leg portion with a force which, for a given relative position of the two leg portions, is adjustable.

2. A device according to claim 1, wherein at least respective parts of the leg portions are parallel.

3. A device according to claim 1, wherein there is a bend in at least one of the leg portions.

4. A device according to claim 3, wherein said at least one of the leg portions is pivotally mounted on said main body.

5. A device according to claim 1, wherein said means comprises a spring in compression.

6. A device according to claim 1, wherein said means comprises a cam.

7. A device according to claim 6, wherein said cam comprises a curved ramp.

8. An assembly comprising a device according to claim 1 and a bite indicator comprising an arm, wherein said arm has first and second ends, said first end is pivotally mounted, and said device is placed at said second end.

9. An assembly comprising a device according to claim 1 and a springy-wire bite indicator, wherein said springy-wire bite indicator has a free end to which is connected the said device.

* * * * *